(12) United States Patent
Jones

(10) Patent No.: US 7,176,958 B2
(45) Date of Patent: Feb. 13, 2007

(54) FIFTH WHEEL VIDEO MONITOR SYSTEM

(76) Inventor: Martin G. Jones, 3125 White Horse Rd. #8, Greenville, SC (US) 29611

( * ) Notice: Subject to any disclaimer, the term of this patent is extended or adjusted under 35 U.S.C. 154(b) by 847 days.

(21) Appl. No.: 10/233,955

(22) Filed: Sep. 3, 2002

(65) Prior Publication Data

US 2004/0041942 A1    Mar. 4, 2004

(51) Int. Cl.
  *H04N 5/225*   (2006.01)
  *A47G 23/02*   (2006.01)
(52) U.S. Cl. .................... 348/148; 348/373
(58) Field of Classification Search ........... 348/148, 348/373; *H04N 5/225; A47G 23/02*
   See application file for complete search history.

(56) References Cited

U.S. PATENT DOCUMENTS 5,027,200 A * 6/1991 Petrossian et al. ......... 348/118
5,501,566 A * 3/1996 Engle ...................... 414/333
6,690,413 B1 * 2/2004 Moore ....................... 348/148
2005/0000738 A1 * 1/2005 Gehring et al. ............ 180/14.1

* cited by examiner

Primary Examiner—Tung Vo
(74) Attorney, Agent, or Firm—Barber Legal; Craig Barber

(57) ABSTRACT

At least one video camera mounted upon the tractor part of a truck. An anchor is affixed to the truck so as to prevent any relative motion of anchor and truck, and a rail is affixed to the anchor. A slider is moveably mounted upon the rail so that motion along the rail is allowed but the slider cannot depart from the rail. A camera rack is affixed to the slider but the camera rack and slider are angularly coupled to the trailer/semi-trailer of the truck, so that the rack and any cameras mounted thereon swivel with the trailer, not with the tractor. The angular coupling may be achieved with at least one roller affixed to the camera rack but urged against the trailer. There may be at least two cameras: one showing each side of the trailer.

8 Claims, 9 Drawing Sheets

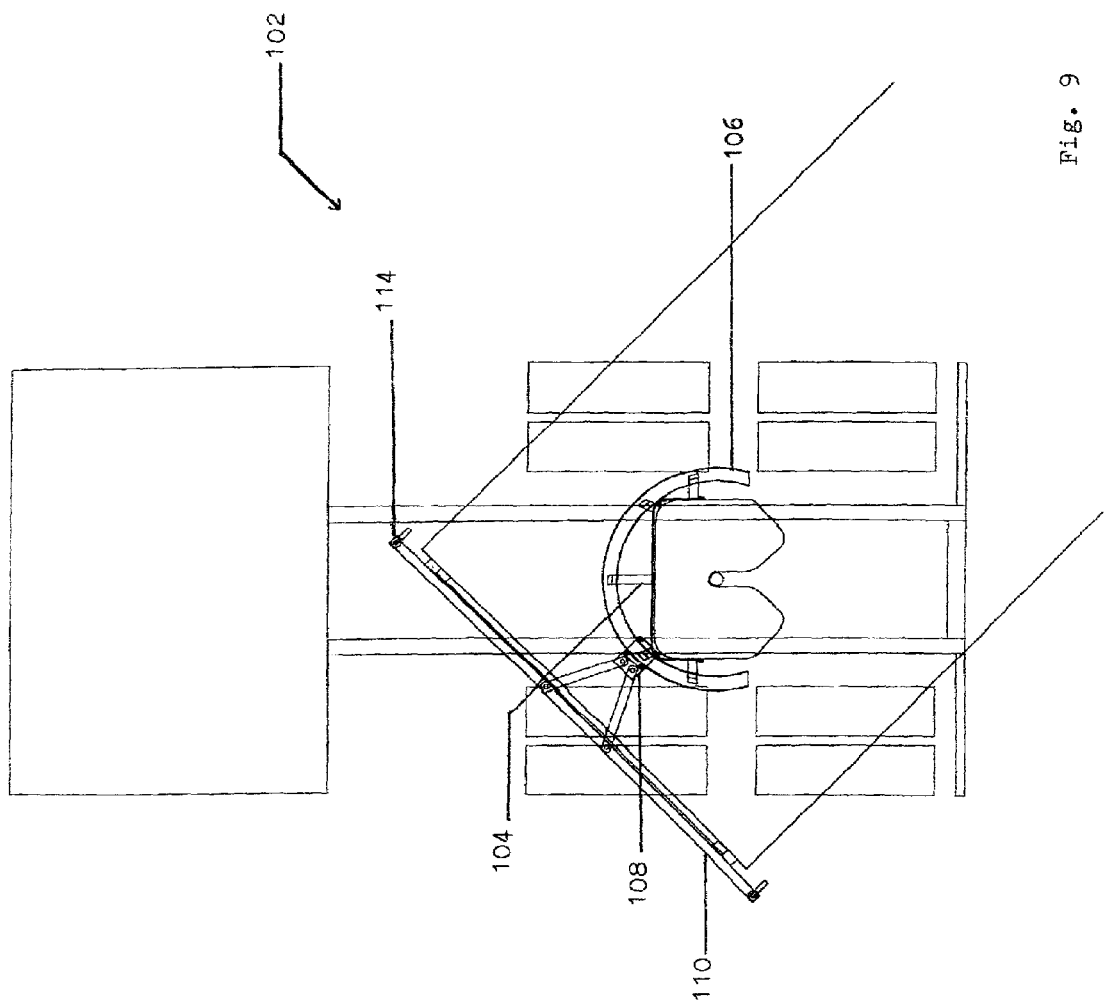

FIFTH WHEEL VIDEO MONITOR SYSTEM

FIELD OF THE INVENTION

This invention relates generally to vehicle video monitors and more specifically to tractor-semi-trailer rigs having a video monitor positioned to allow the driver to view a trailer/semi-trailer hooked up to the fifth wheel mount of the tractor.

BACKGROUND OF THE INVENTION

The difficulty of maneuvering tractor-trailer rigs in close quarters and confined areas is well known. In addition, most tractor-trailer rigs offer the operator only very obstructed views to the rear, causing un-necessary danger to the operator of the vehicle and motorists and pedestrians nearby. Better sight lines would dramatically alleviate such problems.

The present invention teaches a monitor allowing the driver of the vehicle to more safely operate the vehicle. The monitor is arranged to show both sides of the trailer and even to swivel with the trailer so as to continuously maintain those views, and yet, the camera mount is on the tractor portion of the rig, and thus requires no additional connections to the trailer, no mounting of cameras on the trailer, and so on.

As used herein, the terms "fifth-wheel vehicle", "vehicle", "fifth-wheel rig", "fifth-wheel truck" and "truck" are defined to include tractor-trailer combinations, tractor-semi-trailer combinations, combinations including larger numbers of units such as doubles, triples, and even vehicle combinations which strictly speaking fall outside the area of commercial long haul trucking, for example, those pickup trucks having fifth wheel equipment for the purpose of hauling large agricultural, stock, or recreation trailers. Any vehicle combination having a fifth wheel arranged to receive a the kingpin of a trailer or semi-trailer may benefit from the present invention and will be referred to herein under the generic term of "truck", while terms such as tractor or trailer will be used to refer to more specific portions of the combination. This definition of "truck" specifically excludes, for purposes of this application, disclosure and claims, such other transportation which does NOT have fifth-wheel gear, this definition even excludes non-fifth-wheel trucks. The word "trailer" as used herein specifically includes semi-trailers, agricultural or livestock trailers, recreation trailers and any other device pulled by means of a fifth wheel/kingpin arrangement, and may be generalized to include vehicles pulled by means of other common towing arrangements.

The issues of ease of maneuvering and providing driver/operators with safe views are multifaceted. Even the drivers of passenger vehicles such as sedans must contend with the blind spot, that region behind the driver and just to each side of the vehicle. In the case of trucks, this blind spot grows to a great size. In the case of the ordinary semi-trailer, the blind spot may be 50 feet (over 15 meters) or more. In the case of a "Rocky Mountain Double" comprising a tractor, a semi-trailer, and a trailer following the semi-trailer, the rig may have a blind spot over 100 feet (over 30 meters) in length. The traditional structure for mitigating the blind spot was a copious supply of oversized mirrors, especially a combination of flat and convex mirrors. Convex mirrors provide a wider angular line of sight, however, reduce the size of objects they display, distort proportions, and make objects appear to be further away than they really are. More importantly, when the trailer and tractor are at an angle, the mirrors on one side of the tractor are rendered effectively useless: the trailer is no longer oriented along the line of sight offered by the mirror, or the trailer blocks all views in any case. These are not desirable visual properties for a truck operator to have to contend with in safe operation of the vehicle.

One more modern solution to this problem is the video monitor. A video camera may be placed on the truck to show the rear-view on a cab-mounted monitor. In general, known video systems are mounted either on the tractor or on the semi-trailer. Surprisingly, this solution is not popular among truck operators. There are several reasons for the unpopularity of known video systems. If the camera is mounted on the trailer, then it must be connected to the tractor when the trailer is connected and disconnected when the trailer is disconnected. In addition, the monitor in the tractor will be useless when the trailer is one having no camera's installed, and should an unequipped trailer be pulled, the driver will be forced to suddenly readjust to a different and more demanding style of driving. In addition to that, most organizations own far more trailers than tractors, making it economically disadvantageous to equip every trailer this way. Forcing the driver to adapt this way places an un-necessary demand on the driver's skills.

If the camera is mounted on the tractor without the ability to automatically change direction, these problems are replaced by more serious ones. In particular, one very useful mode of employment of the invention occurs at low speeds, when the driver is maneuvering the truck in light quarters, is backing to a loading dock, is surrounded by workers on foot or commuters in cars, etc. In these situations, the use of the camera and monitor become very important, but the flexibility of the tractor-trailer combination will often defeat the camera. If the camera is mounted on the tractor and is unable to follow the rotation motion of the trailer, the view of the camera will normally be obstructed to some degree. However, when the tractor and trailer make a turn or maneuver, they will be at some angle to each other and the degree of blockage will increase. The tractor mounted camera will then have the entire trailer acting a large wall to block it's view. As the trailer may be several meters tall, many meters long, and may reach an angle of 90 degrees with the tractor or in extreme circumstances even more than 90 degrees, the result is that the operator will suddenly find themselves with a very large blind spot just when they most require the camera's operation.

This blind spot also results in widespread hidden economic costs. The process of backing up becomes much more time and labor intensive, not to mention more prone to causing property damage to the cargo, the trailer and nearby structures. In one frequent situation, the operator must get out of the vehicle and examine directly the situation, before resuming control of the rig, backing up a modest amount, and repeating the process again.

These safety issues are vital not just to the truck operator and to motorists in general, but also to the pedestrians on the street or at work sites, loading docks, truck stops, factories, commercial buildings and any other locations at which the truck may operate. These safety issues further have a direct impact on the cost of insurance and thus a direct impact on the costs of truck operations.

In addition, tractor-trailer rigs are susceptible to a problem commonly referred to as "jack-knifing" in which the tractor and trailer reach a relative angular position well in excess of 90 degrees. Any solution should offer the operator the ability to continue to see the blind spot even at angles in excess of 90 degrees, and obviously should not damage the trailer, tractor, or viewing equipment.

Various attempts have been made to address these problems.

U.S. Pat. No. 5,530,421 issued Jun. 25, 1996 to Marshall et al teaches an interesting electronic system for automated control of a system of cameras based upon the activities of the operator of the truck. For example, placing the truck in a reverse gear, activating turn signals or hazard lights may all alter the choice of camera which the monitor displays. However, as the system is electronic there is no mechanical method disclosed for keeping the camera properly oriented to serve the needs of the driver, nor is the device king-pin related, nor does it disclose the structures of the present invention.

U.S. Pat. No. 6,225,895 issued May 1, 2001 to Bigelow, Jr teaches a system for monitoring of the tires of a vehicle being towed, specifically, for monitoring tire pressure. In embodiments, video cameras may be mounted on the towed vehicle. It does not disclose the structures of the present invention, such as video cameras mounted upon the correct portions of the towing vehicle.

U.S. Pat. No. 5,104,538 issued Aug. 15, 2000 to Ben-Ghiath teaches a number of complex mirrors and optical devices for providing panoramic views optically. It does not appear to disclose mounting of cameras on a towing vehicle so as to swivel properly when a trailer rotates.

U.S. Pat. No. 4,991,863 issued Feb. 12, 1991 to Hosmer teaches an anti-jackknife apparatus mounted close to the kingpin of a fifth wheel rig. However, the system does not disclose the use of video camera, nor means of automatically aiming them.

U.S. Pat. No. 6,285,278 issued Sep. 4, 2001 to Schutt et al also teaches an electronic system for monitoring a fifth wheel hitch. The system does not use video cameras, nor does it disclose the structures of the present invention.

Finally, U.S. Design Pat. Des. No. 419,092 issued Jan. 18, 2000 to Gildersleeve teaches a monitor for trailer hitch watching trailer hitch alignment. It does not apparently disclose the structures or concepts employed outside of the vehicle.

The present invention is notably different in structure and concept from these prior art references. In addition, the problems discussed previously, and others, are solved by the present invention.

SUMMARY OF THE INVENTION

General Summary

The present invention teaches at least one video camera mounted upon the tractor part of a truck. An anchor is affixed to the truck so as to prevent any relative motion of anchor and truck, and a rail is affixed to the anchor. A slider is moveably mounted upon the rail so that motion along the rail is allowed but the slider cannot depart from the rail. A camera rack is affixed to the slider but the camera rack and slider are angularly coupled to the trailer/semi-trailer of the truck, so that the rack and any cameras mounted thereon swivel with the trailer, not with the tractor. In the preferred embodiment, the angular coupling is achieved with at least one roller affixed to the camera rack but urged against the trailer. Also in the preferred embodiment, there are at least two cameras: one showing each side of the trailer.

In embodiments, the length of the arms of the camera rack may be adjustable so as to allow for different widths of trailers. In addition, the arms of the camera rack may extend (for example, by telescoping) so as to allow the camera to project far from the side of the trailer. This is advantageous when hauling a wide load.

In alternative embodiments, the camera rack may hold the camera at a level below the bottom of the trailer.

Summary in Reference to Claims

In one embodiment, the invention teaches a camera mount for a vehicle having a trailer hitch and trailer, the mount comprising: at least one anchor affixed to such vehicle; at least one rail affixed to the anchor, at least one slider movably mounted upon the rail; and at least one camera rack affixed to the slider, the camera rack further being angularly coupled to such trailer.

In another embodiment, objective, aspect and advantage the invention teaches a camera mount used in a vehicle wherein the trailer hitch further comprises: a fifth wheel hitch, and further wherein: the anchor is affixed to such vehicle at the fifth wheel hitch.

In another embodiment, objective, aspect and advantage the invention teaches a camera mount wherein the camera rack further comprises: at least one video camera affixed to the camera rack.

In another embodiment, objective, aspect and advantage the invention teaches a camera mount wherein the angular coupling of the camera rack to the trailer further comprises: the camera rack being dimensioned and configured so as to press the video camera against the side of the trailer.

In another embodiment, objective, aspect and advantage the invention teaches a camera mount wherein the camera rack further comprises: an angular coupling affixed to the camera rack.

In another embodiment, objective, aspect and advantage the invention teaches a camera rack dimensioned and configured to press against at least one surface of the trailer.

In another embodiment, objective, aspect and advantage the invention teaches that the camera rack may press against the front surface of the trailer.

In another embodiment, objective, aspect and advantage the invention teaches a camera mount wherein the angular coupling further comprises: at least one roller affixed to the camera rack, the camera rack being dimensioned and configured so as to press the roller against one surface of the trailer.

In another embodiment, objective, aspect and advantage the invention teaches a camera mount wherein the anchor further comprises: at least one clamp bracket.

In another embodiment, objective, aspect and advantage the invention teaches a camera mount wherein the affixation of the clamp bracket to the vehicle further comprises: affixing the clamp bracket to the trailer hitch of the vehicle.

In another embodiment, objective, aspect and advantage the invention teaches a camera mount wherein the affixation of the camera to the camera rack further comprises: positioning the camera below the level of the side of the trailer.

In another embodiment, objective, aspect and advantage the invention teaches a method of viewing the blind spots of a towing vehicle having towed vehicle, the method comprising the steps of: affixing at least one anchor to such towing vehicle; movably mounting at least one camera rack having at least video camera to the anchor in a position such that the video camera can view such a blind spot; and angularly coupling the camera rack to the towed vehicle.

In another embodiment, objective, aspect and advantage the invention teaches a camera method of viewing, wherein the anchor comprises a clamp bracket.

In another embodiment, objective, aspect and advantage the invention teaches a method of viewing wherein the step of angularly coupling the camera rack to the towed vehicle comprises urging at least one roller against the side of the towed vehicle, the roller being affixed to the camera rack.

In another embodiment, objective, aspect and advantage the invention teaches a method wherein the step of movably mounting the camera rack further comprises: affixing a slider to the camera rack, and movably mounting the slider upon a rail affixed to the anchor.

In another embodiment, objective, aspect and advantage the invention teaches a method of viewing wherein the first camera rack further holds the camera at an elevation lower than the bottom of the trailer in the vicinity of the camera.

BRIEF DESCRIPTION OF THE DRAWINGS

FIG. 9 is a hidden-line top view of an alternative embodiment of the invention mounted upon a truck shown in partial top view while the truck is angled at 45 degrees from the trailer.

DETAILED DESCRIPTION

Figure 1:
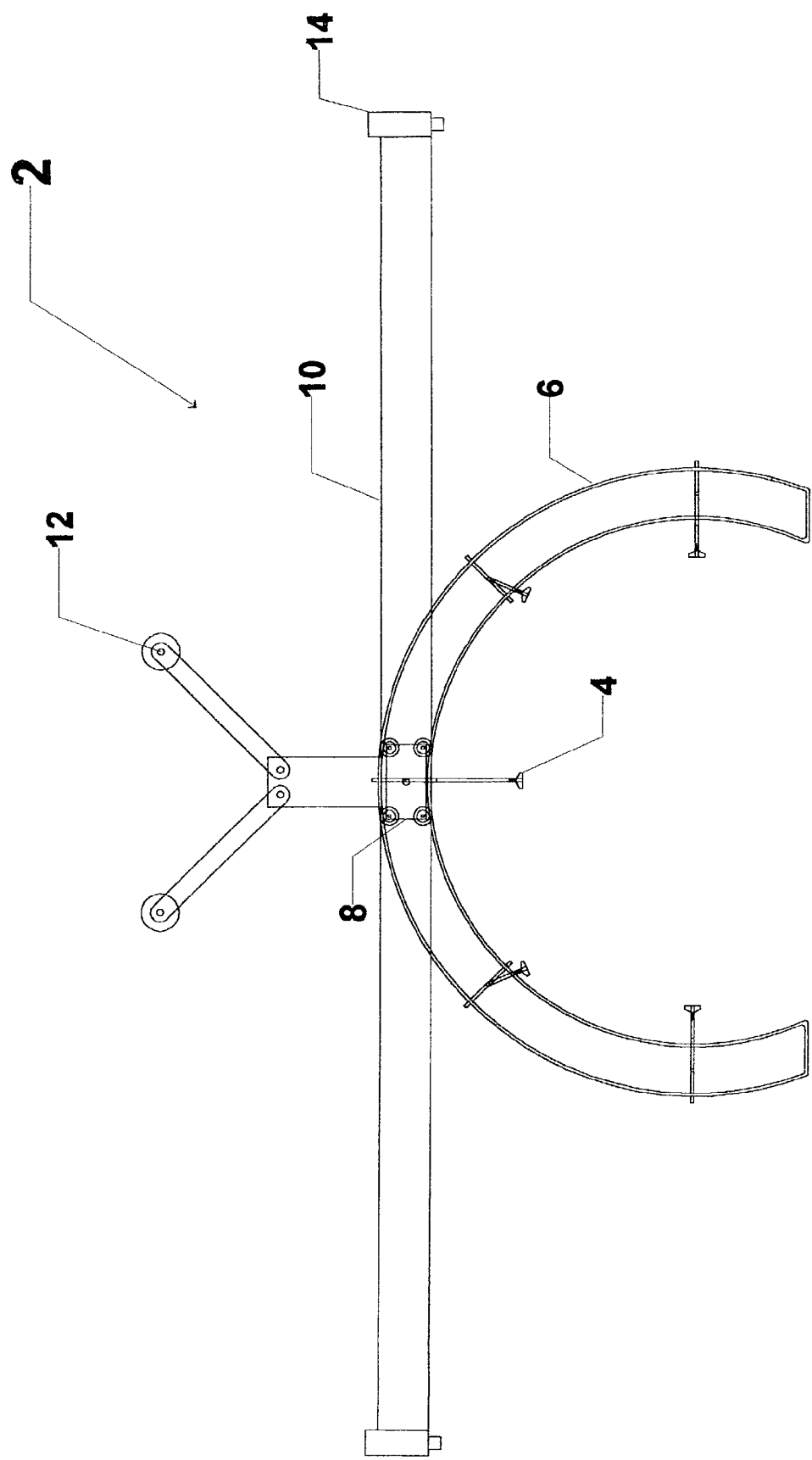
FIG. 1 is a hidden-line ("transparent") top view of a first embodiment of the invention, not mounted on a truck.

FIG. 1 is a hidden-line top view of a first embodiment of the invention, not mounted on a truck. The video monitor system is designed to allow its video cameras to be mounted on the tractor but to swivel, angularly coupled to the trailer, so to provide views of blind spots regardless of the relative angles of tractor and trailer.

The system 2 has anchor 4 which affixes it securely to the fifth wheel of the tractor portion of the truck. Rail 6 is affixed to anchor 4. For purposes of this application, the word affixed means that both angular and translational motions between the two elements so secured are generally prevented. Thus, anchor 4 does not move in angular relation nor in position relative to the fifth wheel, while rail 6 does not move in angular relation nor in position relative to the fifth wheel.

Slider 8 rides in or on rail 6, to which it is movably mounted. In this application the term "movably mounted" indicates that slider 8 may move along rail 6 lengthwise but may not depart from rail 6. Affixed to slider 8 is camera rack 10, which in turn has video camera 14 and roller 12. In the preferred embodiment, camera rack 10 is dimensioned and configured so that video camera 14 may project from underneath a trailer (not shown in FIG. 1) and thus have a clear line of sight down one side of the trailer. Camera rack 10 is further dimensioned and configured so as to urge roller 12 against the trailer.

Roller 12 maintains camera rack 10 in angular alignment with the trailer. When the trailer turns, roller 12 causes camera rack 10 to turn, swiveling along rail 6 on slider 8. Thus by means of the present invention, camera rack 10 and camera 14 thereon are angularly coupled to the trailer even though they are mounted upon the tractor.

Figure 2:
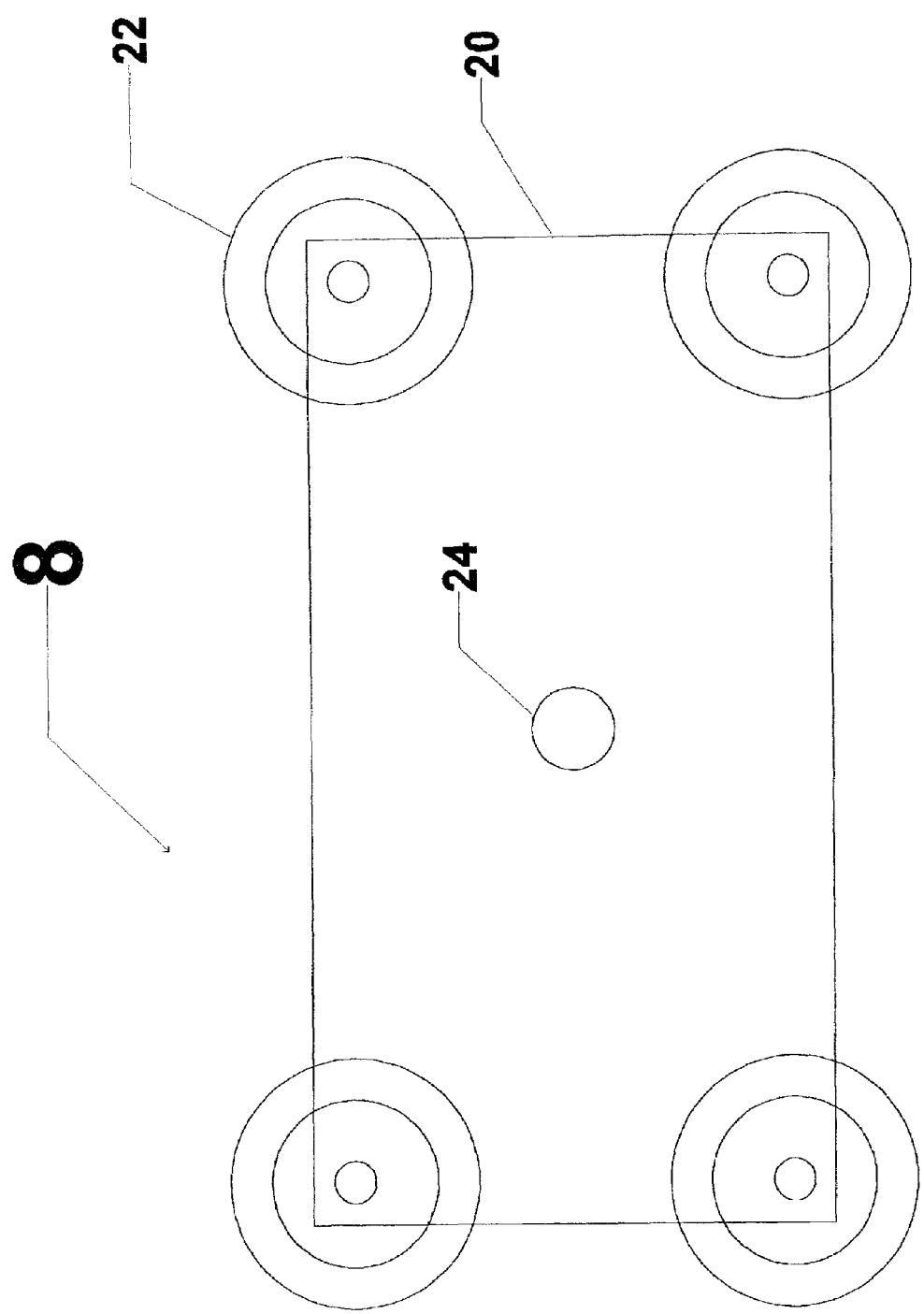
FIG. 2 is a hidden-line top view of the slider of the first embodiment of the invention.

FIG. 2 is a hidden-line top view of the slider of the first embodiment of the invention. Slider 8 has body 20, wheels 22 and anchor-point 24. Wheels 22 cooperate with rail 6 so as to maintain slider 8 movably mounted upon rail 6: slider 8 may move along rail 6 but may not leave rail 6. Camera rack 10, camera 14 and roller 12 are affixed to slider 8 and thus move with slider 8 as a unit, under the influence of roller 12.

Figure 3:
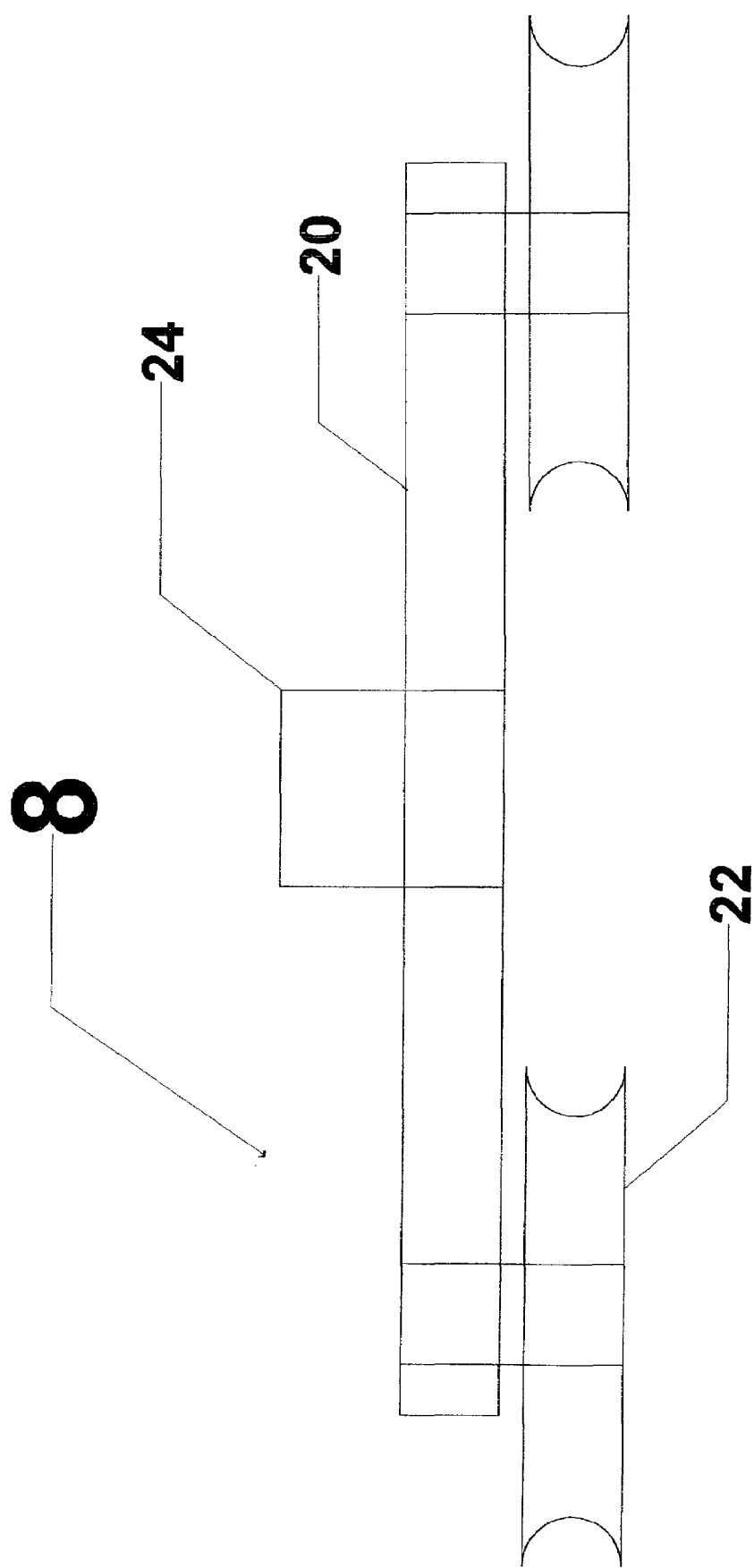
FIG. 3 is a hidden-line side view of the slider of the first embodiment of the invention.

FIG. 3 is a hidden-line side view of the slider of the first embodiment of the invention. Slider 8 has body 20, wheels 22 and anchor point 24 which affixes to camera rack 10 (not shown in FIG. 3). In this embodiment, wheels 22 have a concave cross-section but it will be appreciated that equivalent structures are possible.

Figure 4:
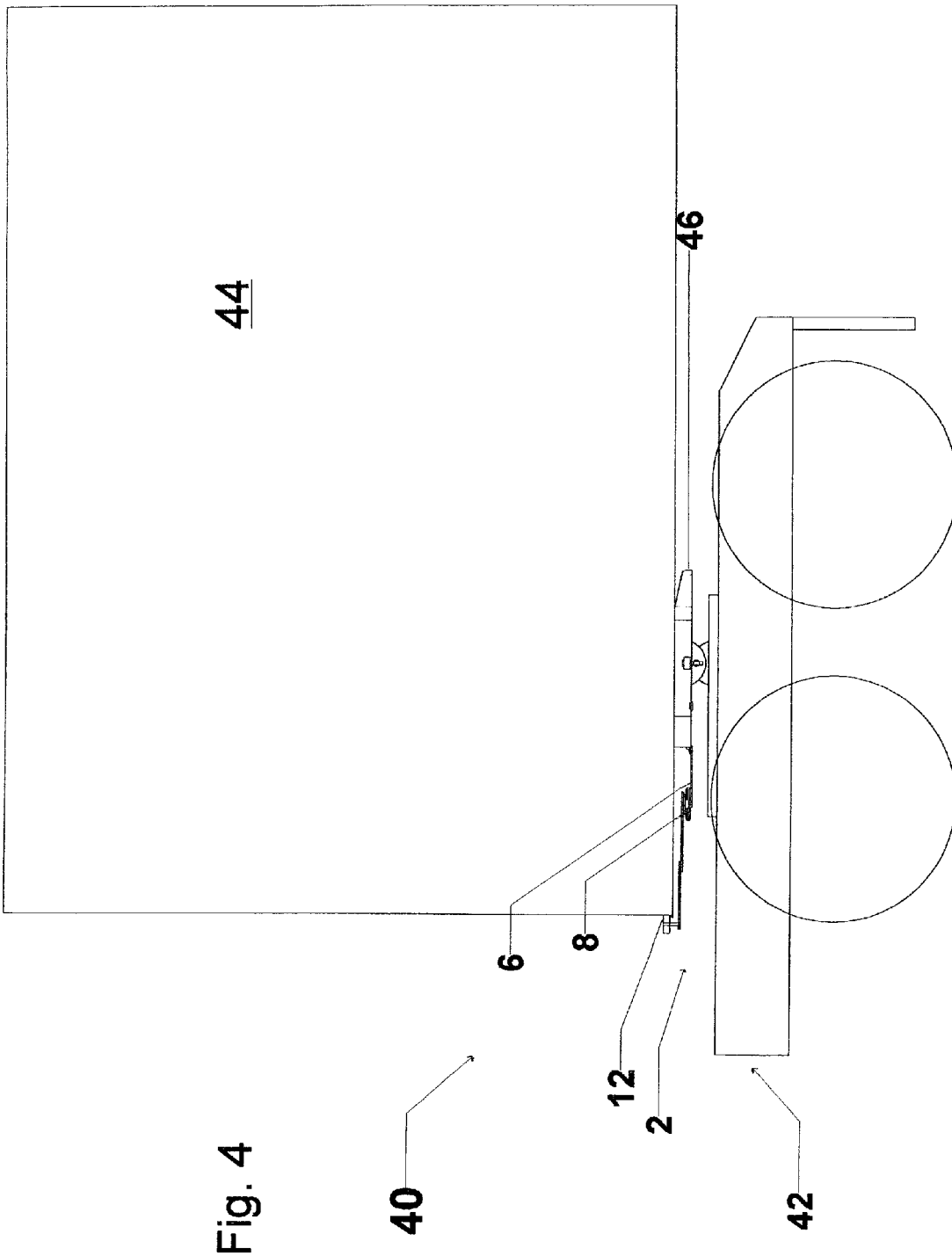
FIG. 4. is a side view of a second embodiment of the invention, mounted upon a truck shown in partial side hidden-line view.

FIG. 4. is a partial hidden-line side view of a second embodiment of the invention, mounted upon a truck shown in partial side view. Truck 40 comprises tractor 42 (shown partially) and trailer 44 (shown partially) connected by fifth wheel 46. The king pin is not visible. System 2 has slider 8 movably mounted upon rail 6. Roller 12 is urged against the front side of trailer 44. As trailer 44 turns, it will be appreciated that roller 12 will cause the invention to swivel as slider 8 moves upon rail 6.

Advantageously, camera 14 may be mounted below the level of the bottom of the trailer. In the preferred embodiment and best mode presently contemplated, the lower elevation of the camera serves several useful purposes. First, it provides a better view of ground level obstructions, other vehicles, pedestrians and so on, all of which tend to be at or near ground level. Second, the lower elevation of the camera prevents damage to the camera in the event of extreme turning angles, as will be demonstrated with reference to the next several drawings.

In alternative embodiments, camera 14 may press or be urged against the side or front of trailer 44. This eliminates the need for roller 12, as camera 14 will itself maintain the angular coupling of camera rack 10 and trailer 44. However, it does not present the advantage discussed below.

Figure 5:
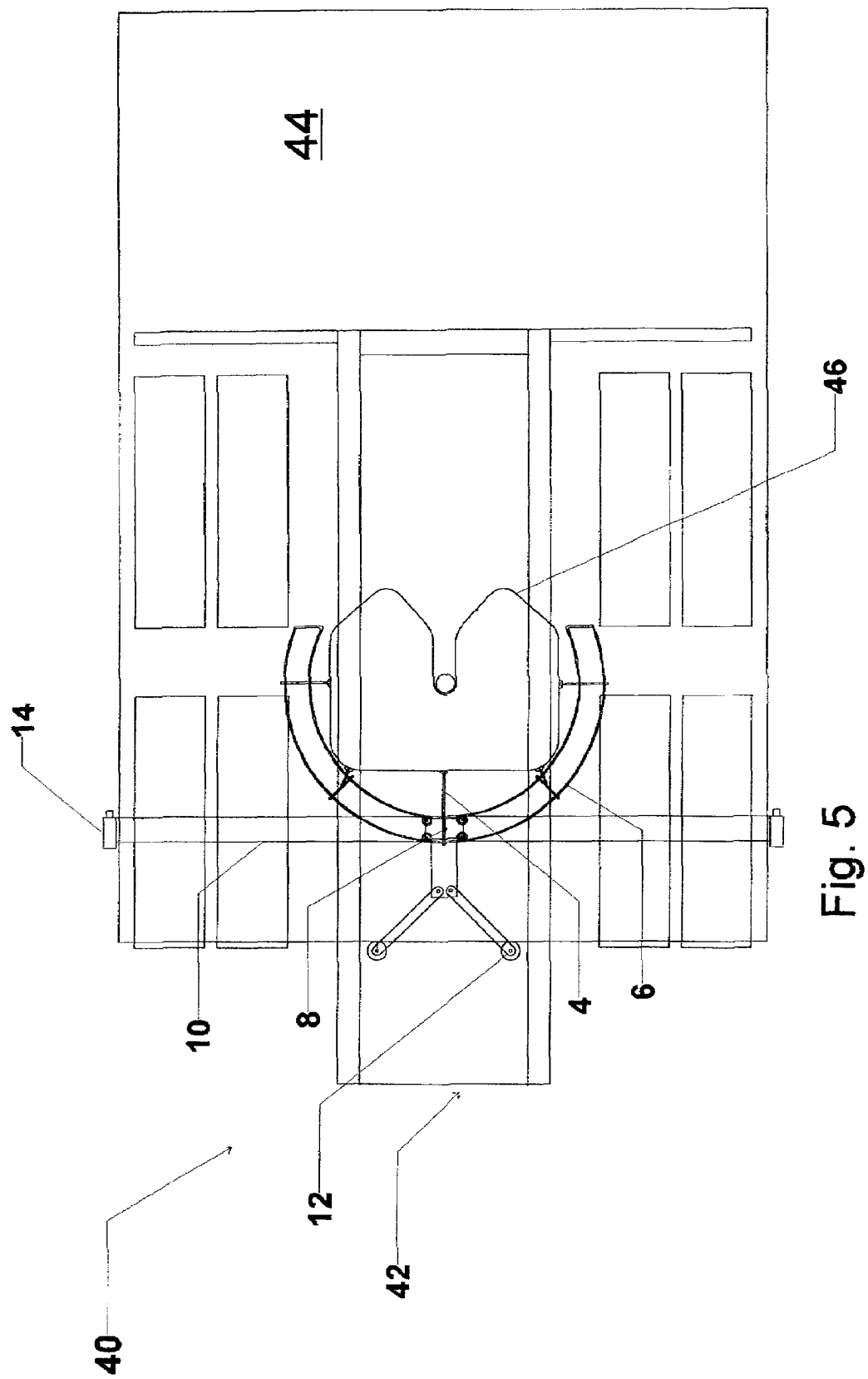
FIG. 5. is a hidden-line top view of the invention mounted upon a truck shown in partial top view while the truck is aligned with the trailer.

FIG. 5. is a hidden-line top view of the invention mounted upon a truck shown in partial hidden-line view while the truck is aligned with the trailer. Truck 40 has tractor 42 and trailer 44 connected by fifth wheel/kingpin 46. Anchor 4 holds rail 6 affixed to tractor 42, while slider 8 is movably mounted upon the track made by rail 6. Camera rack 10 urges roller 12 against trailer 44 and further holds camera 14 projecting beyond the side of trailer 44.

The next three figures show the truck turning, and causing larger and larger relative angles between tractor 42 and trailer 44.

Figure 6:
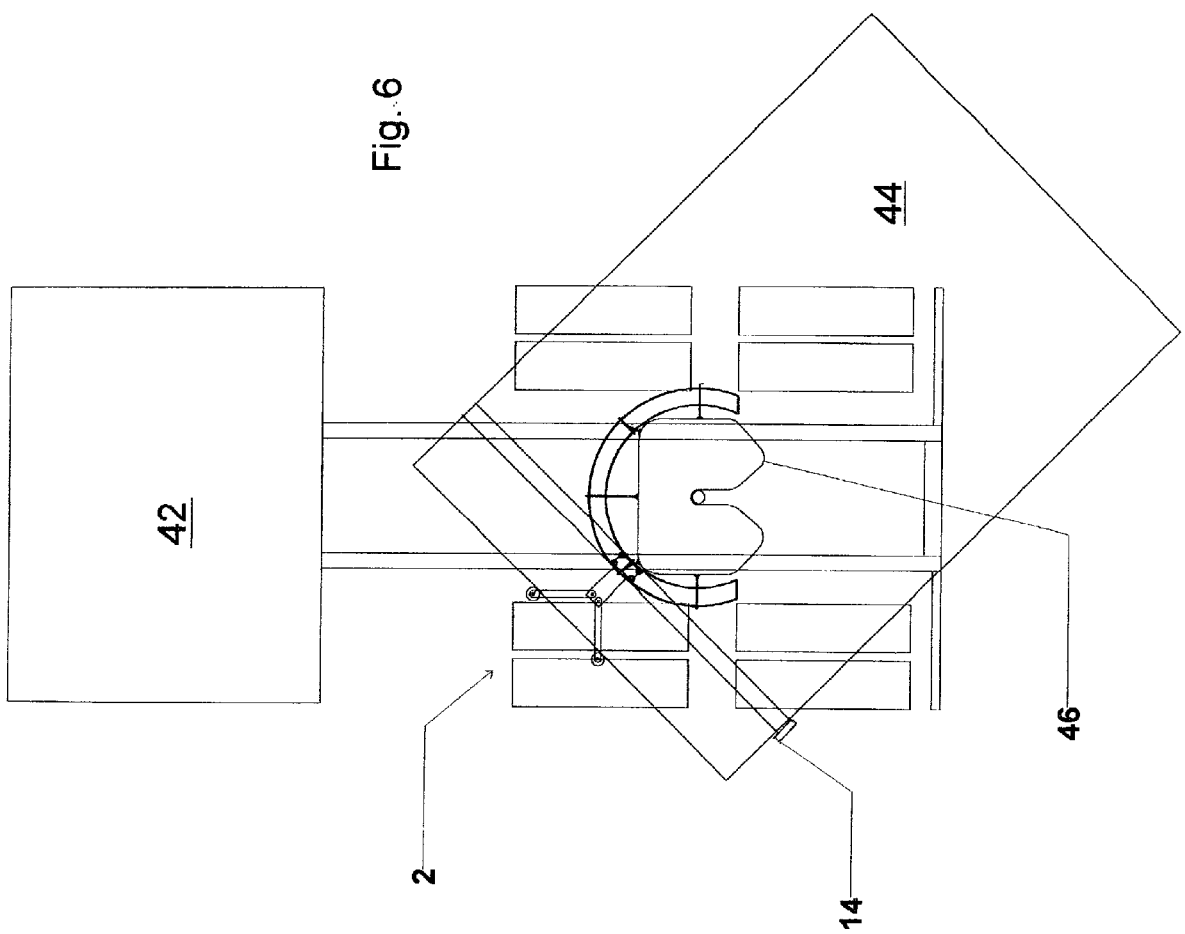
FIG. 6. is a hidden-line top view of the invention mounted upon a truck shown in partial top view while the truck is angled at 45 degrees with the trailer.

FIG. 6. is a hidden-line top view of the invention mounted upon a truck shown in partial hidden-line view while the truck is angled at 45 degrees with the trailer. It will be appreciated that a very large blind-spot exists on the left (as sensed by viewing of FIG. 6) side of trailer 44 when tractor 42 is angled as shown. This blind spot is alleviated by camera 14, which shows that side of trailer 44 and whatever may be present in the blind spot, even though the substantial body of trailer 44 is blocking the direct view by the driver, and further blocking any reflected view by the driver which might be obtained by means of a mirror mounted on the driver's side of the tractor.

Figure 7:
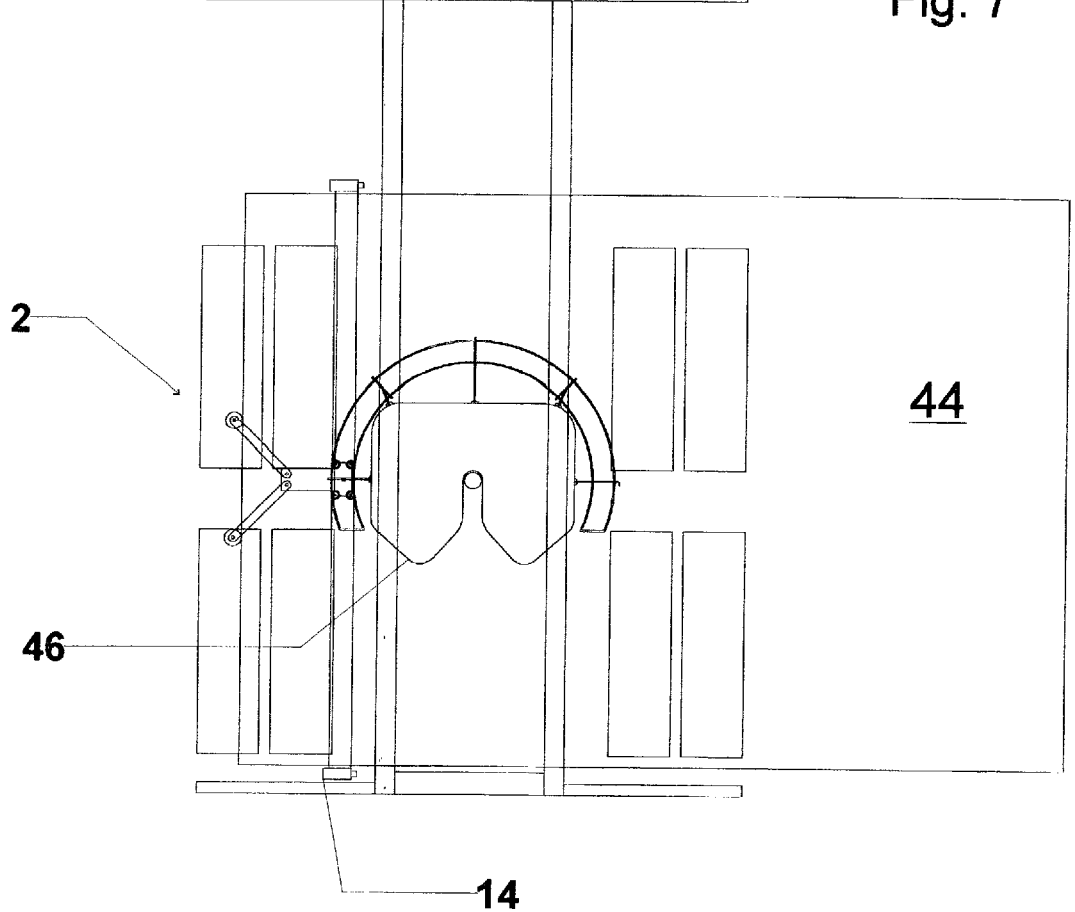
FIG. 7. is a hidden-line top view of the invention mounted upon a truck shown in partial top view while the truck is angled at 90 degrees with the trailer.

FIG. 7. is a hidden-line top view of the invention mounted upon a truck shown in partial hidden-line view while the truck is angled at 90 degrees with the trailer. At this angle, the blind-spot on the left side of trailer 44 is now the length of trailer 44, and safe maneuvering of the truck by the driver is difficult.

Such positions are in fact sometimes achieved during ordinary operation of the vehicle: the "90 degree" jack-knife may occur as the driver attempts to maneuver the truck into or around an extremely constricted loading dock area, industrial, commercial or construction zone or other such places. It is at precisely such times that there are most likely to be numerous obstructions, pedestrians, vehicles and so on in the immediate vicinity.

Figure 8:
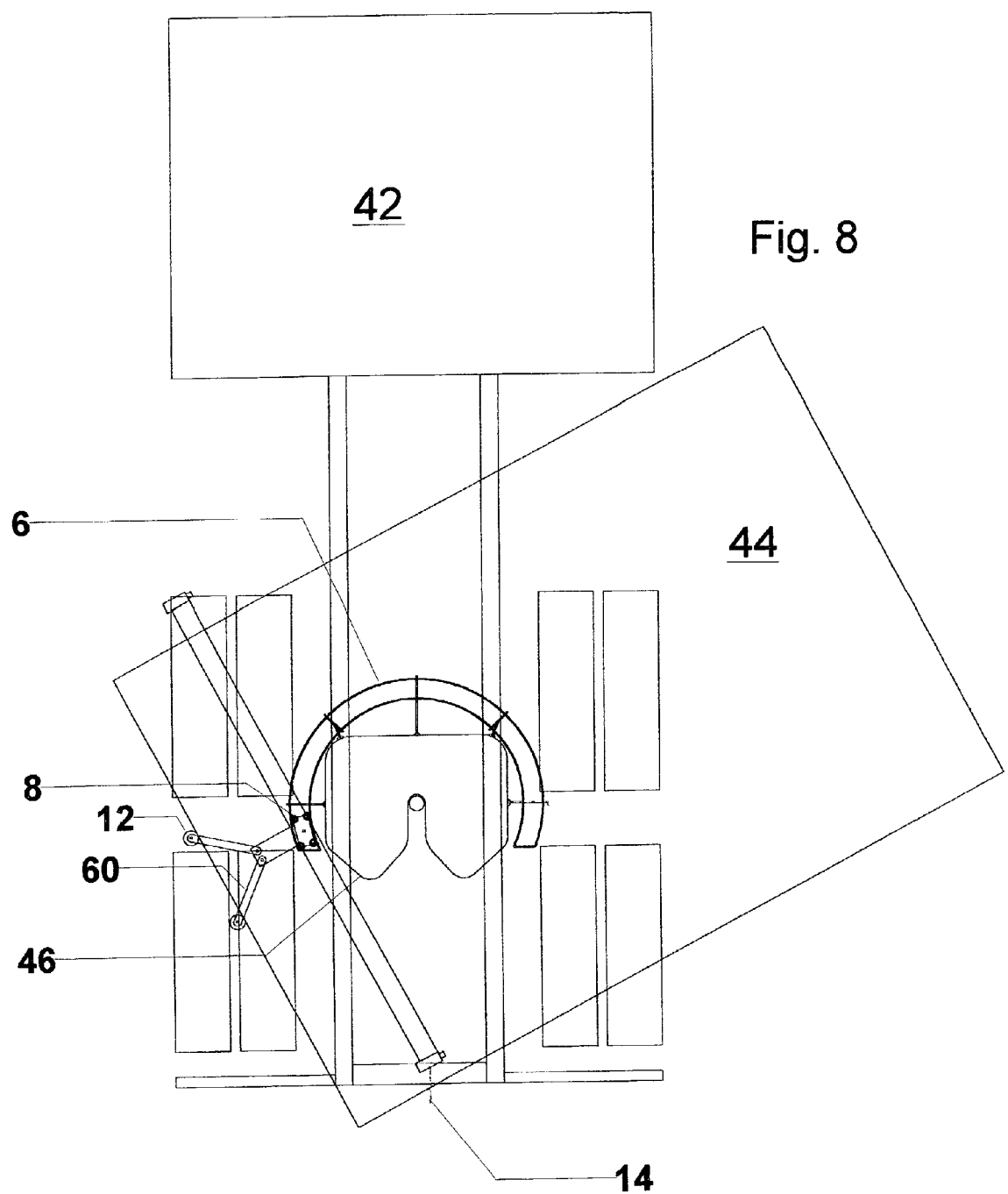
FIG. 8. is a hidden-line top view of the invention mounted upon a truck shown in partial top view while the truck is angled at more than 90 degrees with the trailer.

FIG. 8. is a hidden-line top view of the invention mounted upon a truck shown in partial hidden-line view while the truck is angled at more than 90 degrees with the trailer. Such a jackknife, if it occurs at speed, is likely to cause extreme damage to the truck, and normally, drivers attempt to avoid this. Slider 8 has reached the end of track 6 and cannot move further; the swivel action of the invention is not capable of remaining angularly coupled to the trailer. In order to avoid damage to the invention, roller 12 may be mounted upon a hinged or otherwise flexible extension 60 of the camera rack.

In the preferred embodiment of the invention and best mode presently contemplated, it will be appreciated that the reduced elevation of camera 14 allows it to slide under trailer 44, preventing damage to camera 14 and trailer 44. Depending upon the elevation of the bottom of trailer 44 in the vicinity of camera 14, this distance may vary.

In the preferred embodiment, anchor 4 is a clamp bracket having jaws which may be secured onto the fifth wheel by means of retainer nut. In the preferred embodiment, five clamp brackets are used in anchoring the system to the tractor vehicle. The details of the clamp brackets will vary depending upon the exact type of fifth wheel used on the vehicle: while fifth wheel devices are largely standardized, there are significantly different types made by a number of manufacturers. In alternative embodiments, the anchors may affix the system to the tractor vehicle at a location or multiple locations other than the fifth wheel.

In alternative embodiments, the arms of the camera rack may be extendable by an of a number of methods such as telescoping, folding, scissors extenders, etc, all of which allow the cameras to be held at various distances from the vehicle centerline and various distances from the trailer's side. This allows accommodation of trailers of various widths but more importantly, it also allows the cameras to be extended at a distance from the side of the trailer, for use with wide or overhanging loads.

FIG. 9 is a hidden-line top view of an alternative embodiment of the invention mounted upon a truck shown in partial top view while the truck is angled at 45 degrees from the trailer. Invention 102 has anchor 104, rail 106, slider 108, camera rack 110 and camera 114. In this alternative embodiment discussed previously, there is no need for a roller, thus offering simplified manufacture and cost reduction.

While the diagrams display two video cameras, the invention will work with at least one video camera, which phrase includes numbers of video cameras greater than one.

While the word "trailer" has been used herein, it will be understood that this includes semi-trailers and other towed attachments connected by a fifth wheel and king pin. While the word "tractor" has been used herein, the invention may be used with any towing vehicle equipped with a fifth wheel. The word "truck" as used for the combination of tractor and trailer includes any combination of vehicles connected by a hitch, including a modern cube hitch, tow balls and fifth wheel rigs, including recreational trailers and pickup trucks, agricultural and livestock trailers and so on.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A camera mount for a vehicle having a trailer hitch and trailer, the mount comprising:
    at least one anchor affixed to such vehicle;
    at least one rail affixed to the anchor,
    at least one slider movably mounted upon the rail; and
    at least one camera rack affixed to the slider, the camera rack further being angularly coupled to such trailer by an angular coupling having at least one roller affixed thereto, the angular coupling being dimensioned and configured to urge the roller and camera rack against one surface of such trailer; and
    at least one video camera affixed to the camera rack.

2. The camera mount of claim 1, used in a vehicle having a fifth wheel trailer hitch wherein:
    the anchor is affixed to such fifth wheel hitch.

3. The camera mount of claim 1, wherein the anchor further comprises: at least one clamp bracket.

4. The camera mount of claim 3, wherein the affixation of the clamp bracket to the vehicle further comprises:
    affixing the clamp bracket to the trailer hitch of the vehicle.

5. The camera mount of claim 1, wherein the affixation of the camera to the camera rack further comprises:
    positioning the camera below the level of the side of the trailer.

6. A method of viewing the blind spots of a towing vehicle having at least one towed vehicle, the method comprising the steps of:
    a) affixing at least one anchor to such towing vehicle;
    b) movably mounting at least one camera rack having at least one video camera to the anchor by affixing a slider to the camera rack, and movably mounting the slider upon a rail affixed to the anchor in a position allowing the video camera to view a blind spot; and
    c) angularly coupling the camera rack to the towed vehicle by urging at least one roller against the side of the towed vehicle, the roller being affixed to the camera rack.

7. The method of viewing of claim 6, wherein the anchor comprises a clamp bracket.

8. The method of viewing of claim 6, wherein the camera rack further holds the camera at an elevation lower than the bottom of the trailer in the vicinity of the camera.

* * * * *